United States Patent
Kotecha et al.

(10) Patent No.: US 11,386,793 B2
(45) Date of Patent: Jul. 12, 2022

(54) NETWORK OPTIMIZATIONS TO SUPPORT UNMANNED AERIAL VEHICLE COMMUNICATIONS

(71) Applicant: Verizon Patent and Licensing Inc., Basking Ridge, NJ (US)

(72) Inventors: Lalit R. Kotecha, San Ramon, CA (US); Donna L. Polehn, Mercer Island, WA (US); Arda Aksu, Lafayette, CA (US); Vishwanath Ramamurthi, San Ramon, CA (US); Jin Yang, Orinda, CA (US); Maria G. Lam, Oakland, CA (US); Patricia R. Chang, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1 day.

(21) Appl. No.: 16/939,705

(22) Filed: Jul. 27, 2020

(65) Prior Publication Data

US 2022/0028280 A1 Jan. 27, 2022

(51) Int. Cl.

| H04W 4/00 | (2018.01) |
|---|---|
| G08G 5/00 | (2006.01) |
| H04B 7/185 | (2006.01) |
| H04W 76/27 | (2018.01) |
| H04W 76/11 | (2018.01) |
| H04W 84/06 | (2009.01) |
| H04W 12/06 | (2021.01) |
| H04W 16/28 | (2009.01) |
| H04W 4/40 | (2018.01) |
| H04W 84/18 | (2009.01) |
| H04W 8/18 | (2009.01) |

(52) U.S. Cl.
CPC .......... *G08G 5/0013* (2013.01); *G08G 5/0069* (2013.01); *H04B 7/18506* (2013.01); *H04W 4/40* (2018.02); *H04W 8/18* (2013.01); *H04W 12/06* (2013.01); *H04W 16/28* (2013.01); *H04W 76/11* (2018.02); *H04W 76/27* (2018.02); *H04W 84/06* (2013.01); *H04W 84/18* (2013.01)

(58) Field of Classification Search
CPC ............ B64C 39/024; B64C 2201/027; B64C 2201/14; B64C 2201/141; G08G 5/0069; H04B 7/18506; H04B 7/0617; H04B 7/185; H04B 7/18502; H04W 4/021; H04W 36/08; H04W 84/18; H04W 4/023; H04W 84/06
See application file for complete search history.

(56) References Cited

U.S. PATENT DOCUMENTS

| 9,948,380 | B1* | 4/2018 | Vos ..................... H04B 7/18506 |
|---|---|---|---|
| 10,291,314 | B2* | 5/2019 | Dowlatkhah ......... B64C 39/024 |
| 10,939,444 | B1* | 3/2021 | Bellamkonda ........ H04W 24/02 |
| 2020/0162149 | A1* | 5/2020 | Poscher ............. G06Q 10/0631 |
| 2020/0192348 | A1* | 6/2020 | Koziol ................. G08G 5/0069 |
| 2020/0336901 | A1* | 10/2020 | Zhu ....................... H04W 12/37 |
| 2021/0116941 | A1* | 4/2021 | Lee ....................... G01S 17/894 |

\* cited by examiner

*Primary Examiner* — Khalid W Shaheed

(57) ABSTRACT

A device may receive a request to establish a session for a wireless communication device over a wireless network; identify the wireless communication device as an unmanned aerial vehicle; modify operating parameters of a radio access network (RAN), with which the wireless communication device has a radio resource control (RRC) link, to optimize communication between the access network and the unmanned aerial vehicle. The wireless network includes the RAN.

20 Claims, 8 Drawing Sheets

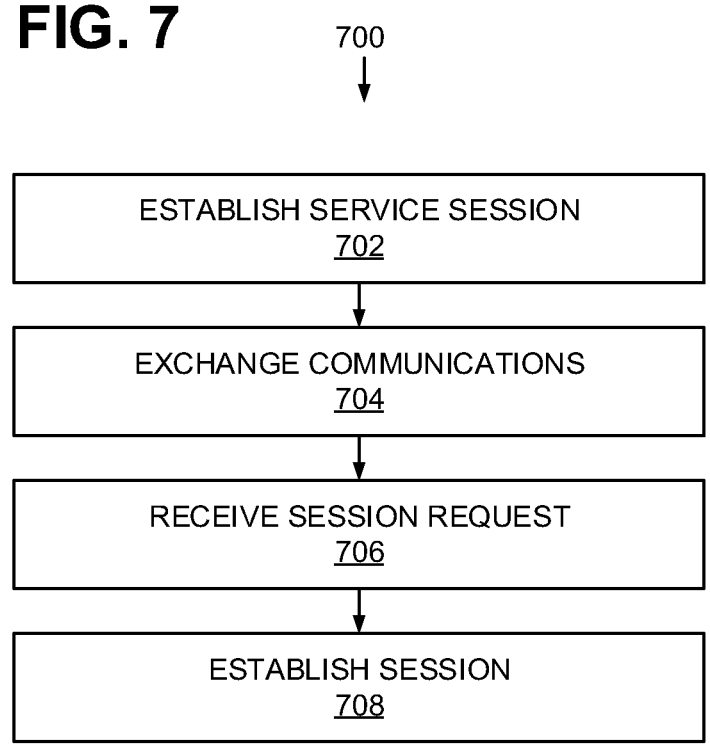

NETWORK OPTIMIZATIONS TO SUPPORT UNMANNED AERIAL VEHICLE COMMUNICATIONS

BACKGROUND INFORMATION

Unmanned Aerial Vehicles (UAVs), are flown remotely by a program or a human pilot. Whether UAVs are flown by human pilots or by programs, however, there are many challenges for quickly deploying the UAVs for flight missions. For example, when a UAV is to be flown by a human pilot, its flight typically needs to be planned manually by a UAV operator. Once the flight is planned, the UAV needs to be taken to the location from which the UAV may begin its mission. The operator would then control the UAV from a ground control station (GCS) or control the UAV using a Radio Frequency (RF) control device. Typically, a UAV operator is required to maintain a line-of-sight to the UAV throughout its flight.

BRIEF DESCRIPTION OF THE DRAWINGS

FIG. 7 is a flow diagram of an exemplary process that is associated with the networks of FIG. 1 for providing services to the flight management system and the UAV of FIG. 1.

DETAILED DESCRIPTION OF PREFERRED EMBODIMENTS

The following detailed description refers to the accompanying drawings. The same reference numbers in different drawings may identify the same or similar elements.

The systems and methods described herein relate to Unmanned Aerial Vehicle (UAV) communications. A UAV is an aerial vehicle that is remotely operated by a pilot or autonomous piloting system that is not onboard the vehicle. A UAV may be implemented in various form factors, carry different types of payloads (including passengers), and, in some implementations, be controlled by a computer without human intervention.

Whether a UAV is operated by a human or by a computer (e.g., an autonomous system), a UAV communicates with the operator. In some systems, UAVs are designed to communicate with their operators via ground control stations over radio frequency (RF) links, for navigation and for transmission of data, such as live video and telemetry. With improvements in wireless network communications technology, however, some UAVs are now designed to leverage existing network infrastructures, such as Fourth Generation (4G) and Fifth Generation (5G) wireless networks. That is, some UAVs, rather than being controlled over a direct RF link, may be controlled over wireless communication networks. Such UAVs can travel distances beyond those limited by the signal strengths of ground control stations or by the operator line-of-sight.

It is anticipated that there will be thousands (perhaps millions) of such UAVs taking flight at any one time, to provide transportation and shipping services over wide geographical areas. To allow such scenarios to take place, however, the underlying wireless communication networks must be capable of providing the necessary bandwidths and support services to the UAVs and their control systems. Toward that end, the systems and methods described herein optimize underlying wireless networks specifically for UAV communications (or more generally, any type of autonomous vehicle communications).

Figure 1:
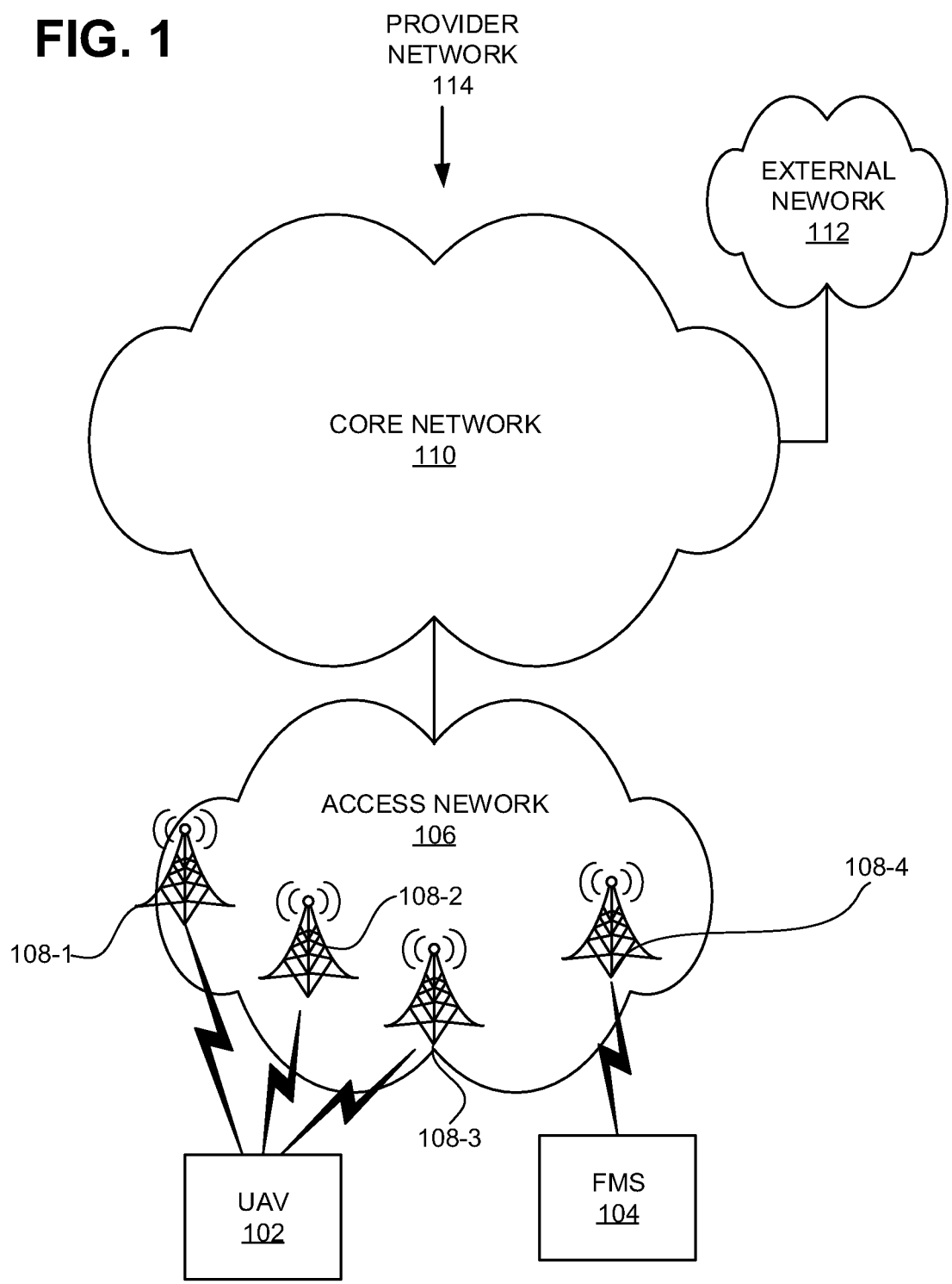
FIG. 1 illustrates an exemplary environment in which systems and methods described herein may be implemented.

FIG. 1 illustrates an exemplary environment in which the systems and the methods described herein may be implemented. As shown, the environment may include a UAV 102, a flight management system (FMS) 104, and a provider network 114, which in turn includes an access network 106, a core network 110, and an external network 112.

UAV 102 may include an aircraft (e.g., a single rotor aircraft, multi-rotor aircraft or fixed wing aircraft) that exchanges signals with flight management system 104. For example, the rotational speed of each rotor for a multi-rotor UAV 102 may be adjusted individually via signals from flight management system 104 to maneuver UAV 102 based on the particular flight goals.

Flight management system 104 may be used by a UAV operator or be programmed to direct the flight of UAV 102 over network 114. In some implementations, flight management system 104 may receive flight-related information from provider network 114 and/or UAV 102. In other implementations, flight management system 104 may also receive, in real-time, data that UAV 102 collects during its flight, such as audio or video. In some implementations, UAV 102 may forward data that it has recorded after its flight.

Flight management system 104 may include software for creating flight plans (e.g., based on input from a human UAV operator). In one implementation, when flight management system 104 has created a flight plan, flight management system 104 may forward its flight path information to network 114, which may then use the path information to optimize its operating parameters, to better accommodate the UAV flight, or to suggest an updated flight plan to flight management system 104.

Access network 106 may allow UAV 102 and flight management system 104 to connect to core network 110 and to one another. To do so, access network 106 may establish and maintain, with participation from UAV 102 and flight management system 104, an over-the-air channel with UAV 102 and/or flight management system 104; and maintain backhaul channels with core network 110. Access network 106 may convey information through these channels, from UAV 102 and flight management system 104 to core network 110 and vice versa, as well as to one another.

Access network 104 may include a Long-term Evolution (LTE) radio network and/or a 5G radio network or other advanced radio network. These radio networks may include many wireless stations, a few of which are illustrated in FIG. 1 as wireless stations 108-1 through 108-4 (generally referred to as wireless station 108 and collectively referred to as wireless stations 108) for establishing and maintaining an over-the-air channel with UAV 102 and flight management system 104.

Depending on the implementation, wireless stations 108 may include a 4G, 5G, or another type of wireless station (e.g., eNB, gNB, etc.) that includes one or more RF transceivers. Wireless stations 108 may include hardware and software to support one or more of the following: carrier aggregation functions; advanced or massive multiple-input and multiple-output (MIMO) antenna functions; Machine-Type Communications (MTC)—related functions, such as 1.4 MHz wide enhanced MTC (eMTC) channel-related functions (i.e., Cat-M1), Low Power Wide Area (LPWA)—related functions such as Narrow Band (NB) Internet-of-Thing (IoT) (NB-IoT) technology-related functions, and/or other types of MTC technology-related functions; Dual connectivity (DC), and other types of LTE-Advanced (LTE-A) and/or 5G-related functions. In some implementations, wireless stations 108 may be part of an evolved UMTS Terrestrial Network (eUTRAN).

Core network 110 may include a local area network (LAN), a wide area network (WAN), a metropolitan area network (MAN), an optical network, a satellite network, a wireless network (e.g., a CDMA network, a general packet radio service (GPRS) network, an LTE network (e.g., a 4G network), a 5G network, an ad hoc network, an intranet, or a combination of networks. Core network 110 may allow the delivery of Internet Protocol (IP) services to UAV 102 and flight management system 104, and may interface with other networks, such as external network 112.

External network 112 may include networks that are external to core network 110. In some implementations, external network 110 may include packet data networks, such as an Internet Protocol (IP) network. An IP network may include, for example, an IP Multimedia Subsystem (IMS) network that may provide a Short Messaging Service (SMS), Voice-over-IP (VoIP) service, etc. External network 112 (or the IMS network) may include components for providing services to UAV 102 and flight management system 104.

In FIG. 1, before its flight, UAV 102 may attach to provider network 114. During the attachment procedure, UAV 102 forwards a unique identifier to network 114, which may then use the identifier to recognize the type of communication device that UAV 102 represents. When network 114 recognizes that UAV 102 is an unmanned aerial vehicle type, network 114 may make appropriate adjustments to its operating parameters to further accommodate the UAV's communications. If flight management system 104 also attaches to network 114, network 114 may allow flight management system 104 to establish a link with UAV 102, for controlling UAV 102 and/or to receive data transmitted from UAV 102. These and other network optimizations are further described below with reference to FIG. 3A through FIG. 7.

FIG. 1 does not show all components that may be attached to or included in environment or networks 106, 110, and 112 for simplicity (e.g., routers, bridges, wireless access point, additional networks, additional UAVs, flight management systems, etc.). That is, depending on the implementation, environment 100 may include additional, fewer, different, or a different arrangement of components than those illustrated in FIG. 1.

Figure 2:
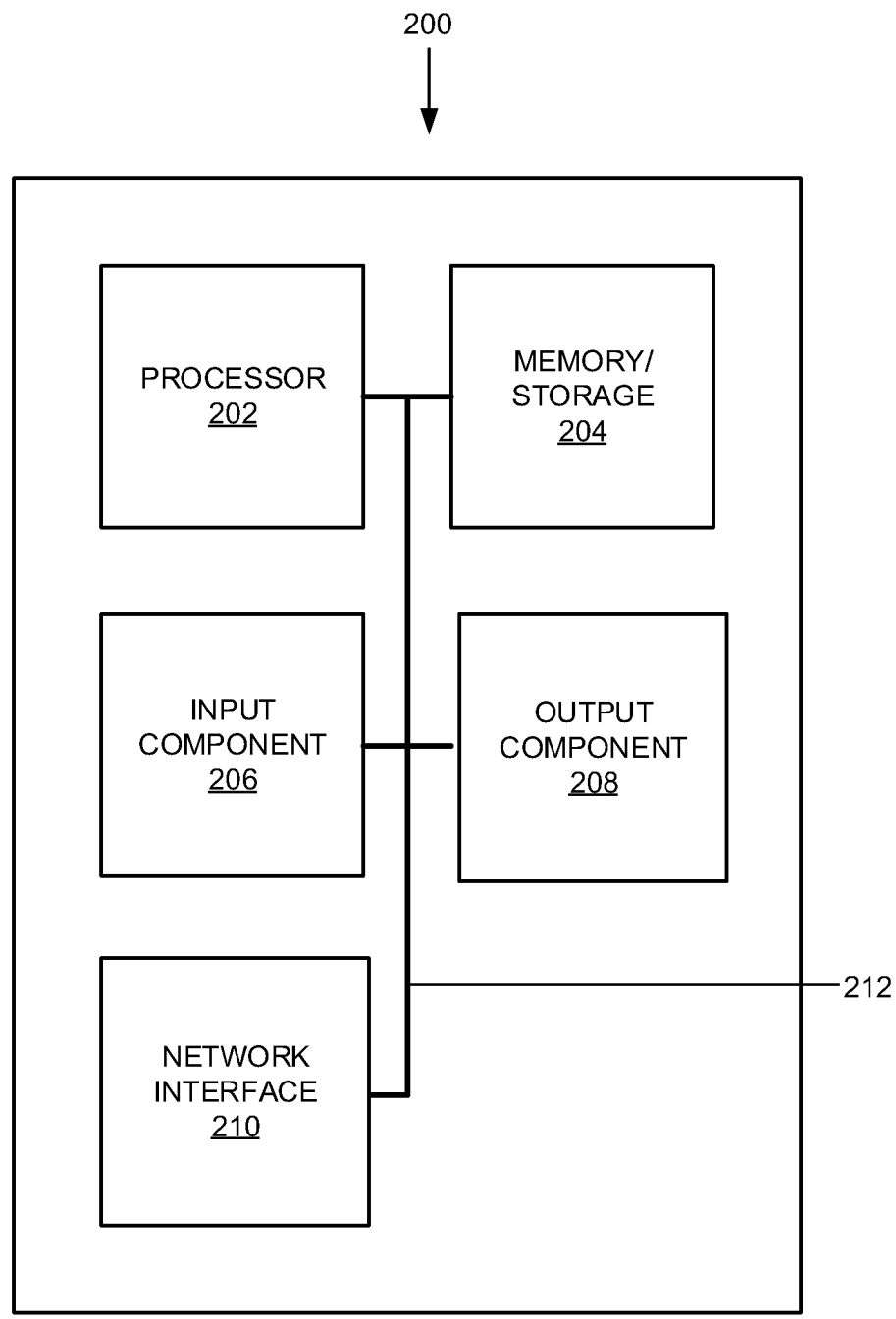
FIG. 2 depicts exemplary components of an exemplary network device of the environment of FIG. 1.

FIG. 2 depicts exemplary components of an exemplary network device 200. Network device 200 corresponds to or is included in UAV 102, flight management system 104 and any of the network components of FIG. 1 (e.g., wireless stations 108, a router, a network switch, servers, gateways, etc.). Examples of devices that include network device 200 are: a smart phone; a tablet device; a global positioning system (GPS) device; a laptop computer; a desktop computer; a server; and an Internet-of-Thing (IoT) device. In some implementations, network device 200 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. Some of these devices may be referred to as User Equipment (UE) devices.

As shown, network device 200 includes a processor 202, memory/storage 204, input component 206, output component 208, network interface 210, and communication path 212. In different implementations, network device 200 may include additional, fewer, different, or a different arrangement of components than the ones illustrated in FIG. 2. For example, network device 200 may include a display, network card, etc.

Processor 202 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.).

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200. Input and output components 206 and 208 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 200.

Network interface 210 may include a transceiver (e.g., a transmitter and a receiver) for network device 200 to communicate with other devices and/or systems. For example, via network interface 210, network device 200 may communicate with a ground control station, or with devices over a network.

Network interface 210 may include an Ethernet interface to a LAN, and/or an interface/connection for connecting device 200 to other devices (e.g., a Bluetooth interface). For example, network interface 210 may include a wireless modem for modulation and demodulation.

Communication path 212 may enable components of network device 200 to communicate with one another.

Network device 200 may perform the operations described herein in response to processor 202 executing software instructions stored in a non-transient computer-readable medium, such as memory/storage 204. The software instructions may be read into memory/storage 204 from another computer-readable medium or from another device via network interface 210. The software instructions stored in memory or storage (e.g., memory/storage 204, when executed by processor 202, may cause processor 202 to perform processes that are described herein. For example, management application 107 may be executed by processor 202 of UAV flight management device 104, to render map layers to illustrate various airspace features.

Figure 3A:
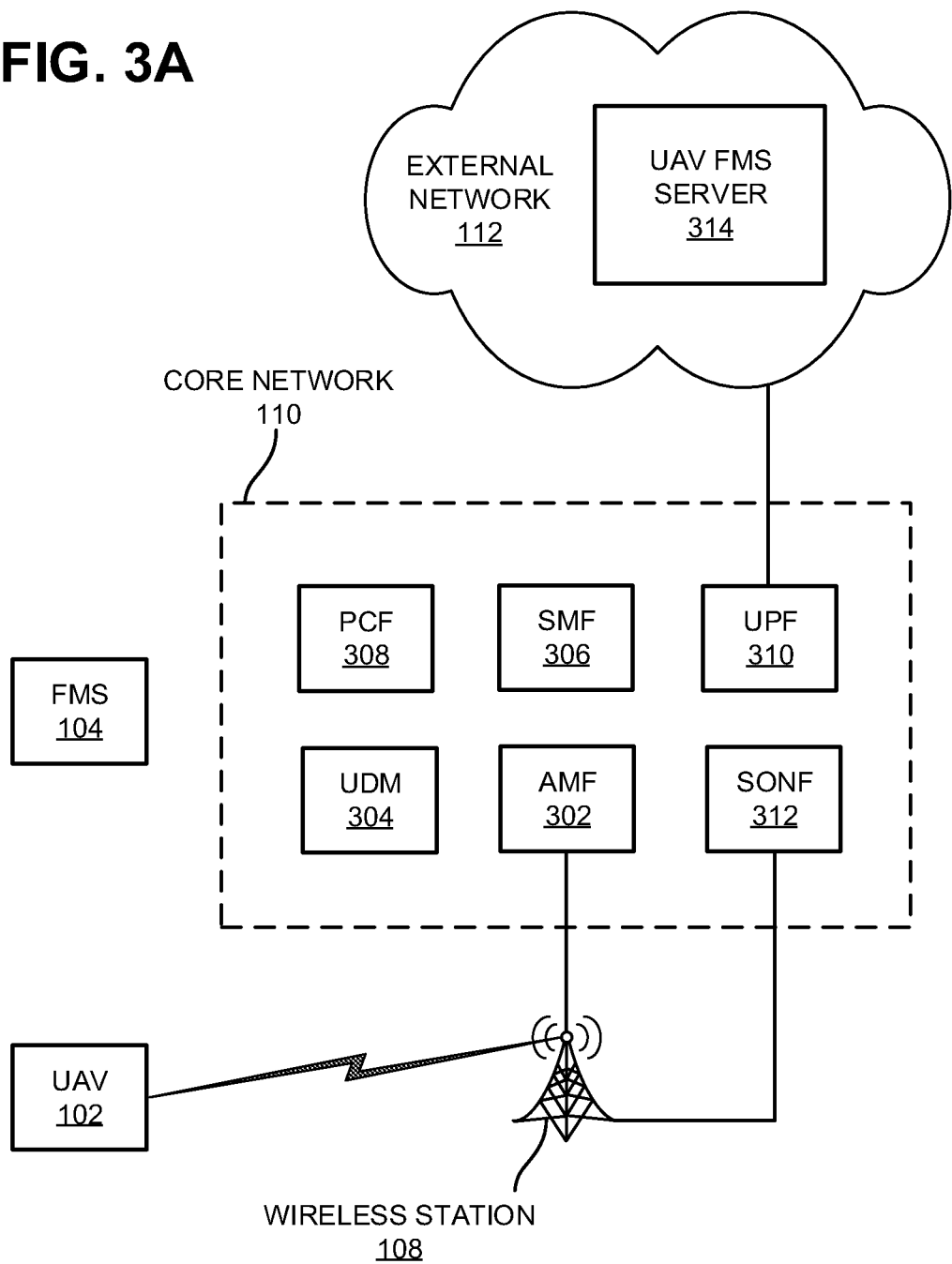
FIG. 3A illustrates exemplary components of the core network and the external network of FIG. 1 according to one implementation.
Figure 3B:
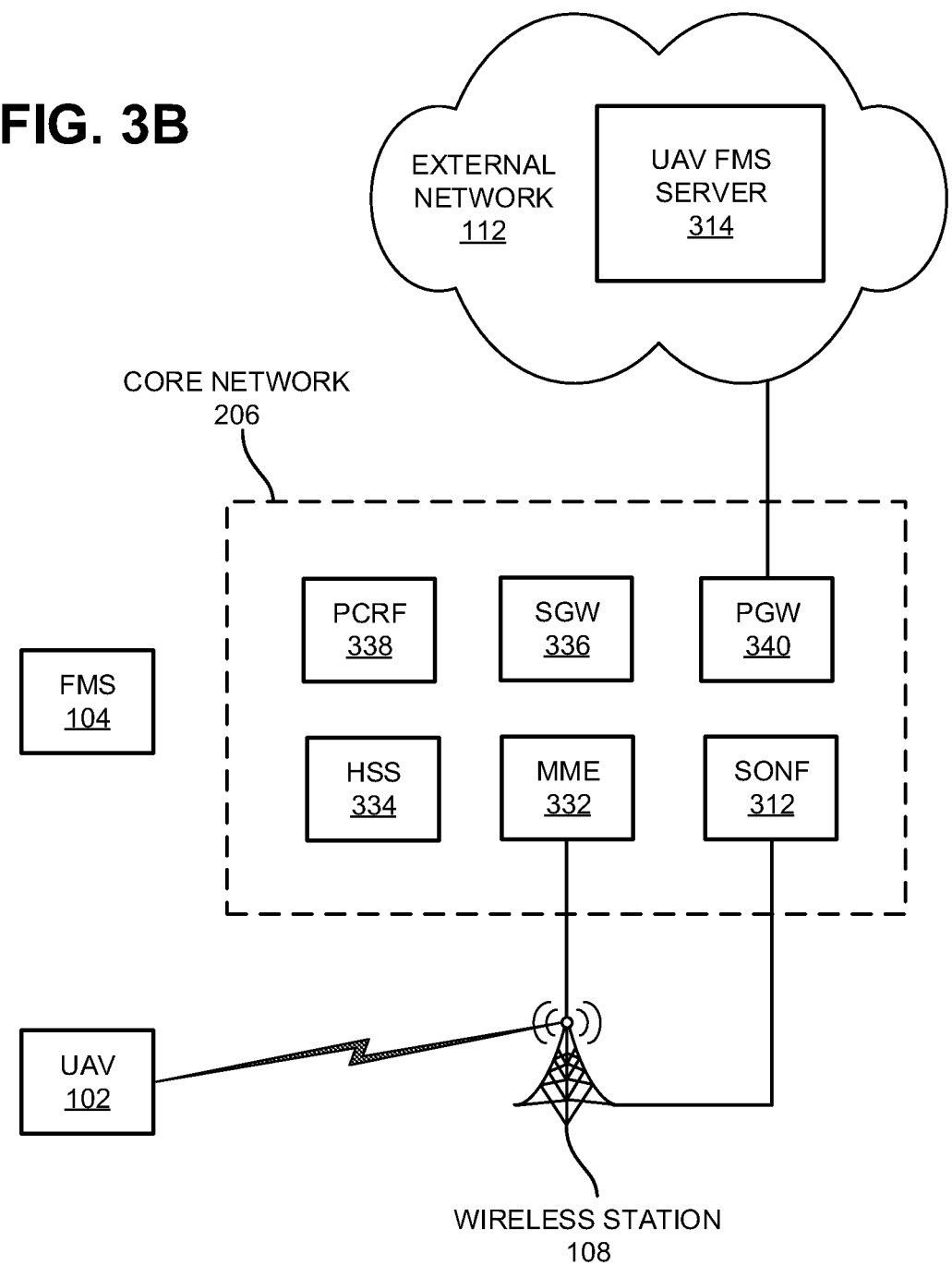
FIG. 3B illustrates exemplary components of the core network and the external network of FIG. 1 according to another implementation.

FIGS. 3A and 3B show exemplary network components that may be included in core network 110 and external network 112 of FIG. 1 according to different implementations. More specifically, FIGS. 3A and 3B show components of core network 110 and external network 112 when core network 110 is implemented as part of a 5G network and a 4G network, respectively. As shown, when implemented as part of a 5G network, core network 110 may include: an Access and Mobility Function (AMF) 302, a Unified Data Management (UDM) function 304, a Session Management Function (SMF) 306, a Policy Control Function (PCF) 308, a User Plane Function (UPF) 310, and a Self-Organizing Network function (SONF) 312. External network 112 may include a UAV FMS server 314.

AMF 302 may perform registration management, connection management, reachability management, mobility management, lawful intercepts, Short Message Service (SMS) transport between a UE device (e.g., UAV 102, flight management system 104, etc.) and an SMS function (not shown in FIG. 3A), session management message transport between a UE device and SMF 306, access authentication and authorization, location services management, support of non-3GPP access networks, and/or other types of management processes. AMF 302 may page a UE device based on mobility category information associated with the UE device obtained from UDM 304. In some implementations, AMF 302 may implement some or all of the functionality of managing RAN slices in wireless stations 108.

UDM 304 may: maintain subscription information for UE devices; manage subscriptions; generate authentication credentials; handle user identification; perform access authorization based on subscription data; perform network function registration management; maintain service and/or session continuity by maintaining assignment of SMF 306 for ongoing sessions; support SMS delivery; support lawful intercept functionality; and/or perform other processes associated with managing user data. For example, UDM 304 may store subscription profiles that include authentication, access, and/or authorization information. Each subscription profile may include: information identifying UE devices; authentication and/or authorization information for UE devices; information identifying services enabled and/or authorized for UE devices; device group membership information for UE devices; and/or other types of information associated with UE devices. Furthermore, the subscription profile may include mobility category information associated with UE devices.

SMF 306 may: perform session establishment, modification and/or release; perform IP address allocation and management; perform Dynamic Host Configuration Protocol (DHCP) functions; perform selection and control of UPF 310; configure traffic steering at UPF 310 to guide traffic to the correct destination; terminate interfaces toward PCF 308; perform lawful intercepts; charge data collection; support charging interfaces; control and coordinate charging data collection; terminate session management parts of NAS messages; perform downlink data notification; manage roaming functionality; and/or perform other types of control plane processes for managing user plane data.

PCF 308 may support policies to control network behavior, provide policy rules to control plane functions (e.g., to SMF 306), access subscription information relevant to policy decisions, perform policy decisions, and/or perform other types of processes associated with policy enforcement.

UPF 410 may: maintain an anchor point for intra/inter-RAT mobility (e.g., mobility across different radio access technologies (RATs); maintain an external Packet Data Unit (PDU) point of interconnect to a data network (e.g., an IP network, etc.); perform packet routing and forwarding; perform the user plane part of policy rule enforcement; perform packet inspection; perform lawful intercept; perform traffic usage reporting; perform Quality-of-Service (QoS) handling in the user plane; perform uplink traffic verification; perform transport level packet marking; perform downlink packet buffering; send and forward an "end marker" to a RAN node (e.g., wireless stations 108); and/or perform other types of user plane processes.

SONF 312 may receive, from AMF 302, indications of attachments of UAV 102 to network 114, differentiate the UAV 102 from other UE devices attached to network 114, and forward the received information for the UAV 102 to wireless stations 108, along with instructions for modifying operating parameters of wireless stations 108. For example, SONF 312 may instruct wireless stations 108 to adjust beam widths of neighboring wireless station lists in accordance with the UAV speed and altitude.

In another example, SONF 312 may request wireless stations 108 to set Radio Link Failure (RLF) timers to large expiration values. Because UAVs 102 can move rapidly in and out the coverage areas of wireless stations 106, UAVs 102 can experience frequent or intermittent RLFs. Hence, a UAV 102 would need to reattach to network 114 every time it moves out of and then into the coverage area. By setting large RLF timer expiration values for wireless stations 108, when a UAV 102 reenters the coverage area, the bearer setup would still be intact.

When SONF 312 receives pre-flight information from UAS FMS 314 for a UAV 102, SONF 312 may determine optimum operating parameters for wireless stations 108 to facilitate UAV communications. SONF 312 may forward the determined parameter values and instructions to use the parameter values to wireless stations 108. For example, the instructions may command wireless stations 108 to configure beam widths and beam directions. In some implementations, rather than having SONF 312 modify RLF timer expiration values for wireless stations 108 at the time of UAV flight, if SONF 312 has pre-flight information, SONF 312 may estimate larger RLF timer expiration values for wireless stations 108 along the flight path, based on distributed unit (UD) and central unit (CU) capabilities of each wireless stations 108. SONF 312 may provide the estimated values to the wireless stations 108.

SONF 312 may receive data pertaining to the locations of wireless stations 108, and their capabilities (e.g., 5G capable), that are along the UAV flight path and provide the coordinates of the wireless stations 108 and their capabilities to UAV FMS server 314. During a UAV flight, SONF 312 may obtain UAV telemetry information from wireless stations 108 and provide the information to UAV FMS server 314. Although FIG. 3A shows SONF 312 as being included in core network 110, in many implementations, SONF 312 may be part of another network, such as external network 114.

UAV FMS server 314 may establish or complete a connection between UAV 102 and flight management system 104, so that flight management system 104 can send commands to UAV 102 for navigation and/or to receive data from UAV 102. In addition UAV FMS server 314 may receive flight-related information from flight management system 104 (e.g., a flight path), UAV FMS 314 may send commands to SONF 312 for reconfiguring wireless stations 108 for optimum UAV communications. To aid flight management system 104 in refining flight plans, UAV FMS server 314 may obtain wireless station-related data from SONF 312 and relay the obtained data to flight management system 104. For example, if there are many 4G wireless stations along a UAV flight path, flight management system 104 may program the UAV 102 to be in the low power mode near 4G wireless stations, to conserve energy—UAV 102 may not be able to transmit video to flight management system 104 over the 4G wireless stations 108.

In FIG. 3A, prior to UAV 102 flights, UAV-related information may be provisioned to UDM 304. In its database of device and subscriber profiles, UDM 304 may insert a record pertaining to UAV 102, and indicate, within the record, that the device is an unmanned aerial vehicle. Furthermore, UDM 304 may notify PCF 308 about the device described in the record. PCF 308 may then implement policies, within network 114, for handling UAV 102 attachment and communications.

When UAV 102 attaches to core network 110 via wireless station 108 and is authenticated via UDM 304, UDM 304 uses the identity of the UAV 102 to retrieve the record on UAV 102 and recognizes UAV 102 as an unmanned aerial vehicle. UDM 304 forwards an information element indicating that the UAV 102 is an unmanned aerial vehicle to AMF 302, as part of its response to the AMF 302 request to UDM 304 to authenticate the UAV 102. AMF 302 may then notify SONF 312, to optimize configuration parameters for wireless stations 108 in relation to UAV 102.

FIG. 3B illustrates exemplary components of core network 110 and external network 112 when the core network 110 is implemented as a 4G core network. As shown, core network 110 may include: a Mobility Management Entity (MME) 332, a Home Subscriber Server (HSS) 334, a Serving Gateway (SGW) 336, a Policy and Charging Rules Function (PCRF) 338, a Packet Data Network Gateway (PGW) 340, and SONF 312. As in FIG. 3A, external network 112 may include UAS FMS server 314. Components 332-340 perform functions that are roughly equivalent to those of AMF 302, UDM 304, SMF 306, PCF 308, and UPF 310.

In both FIGS. 3A and 3B, UAV 102 is shown as accessing core network 110 through wireless station 108. As shown in FIG. 1, wireless stations 108 may be situated in access network 106 (not shown in FIGS. 3A and 3B). Additionally, although core network 110 may include additional network components, for simplicity they are not illustrated in FIGS. 3A and 3B. For example, core network 110 may include other 4G core network components, such as an Authentication Authorization and Accounting (AAA) function, etc., and/or other 5G core network components, such as a network Slice Selection Function (NSSF), a Network Repository Function (NRF), a Network Exposure Function (NEF), etc.

Figure 4:
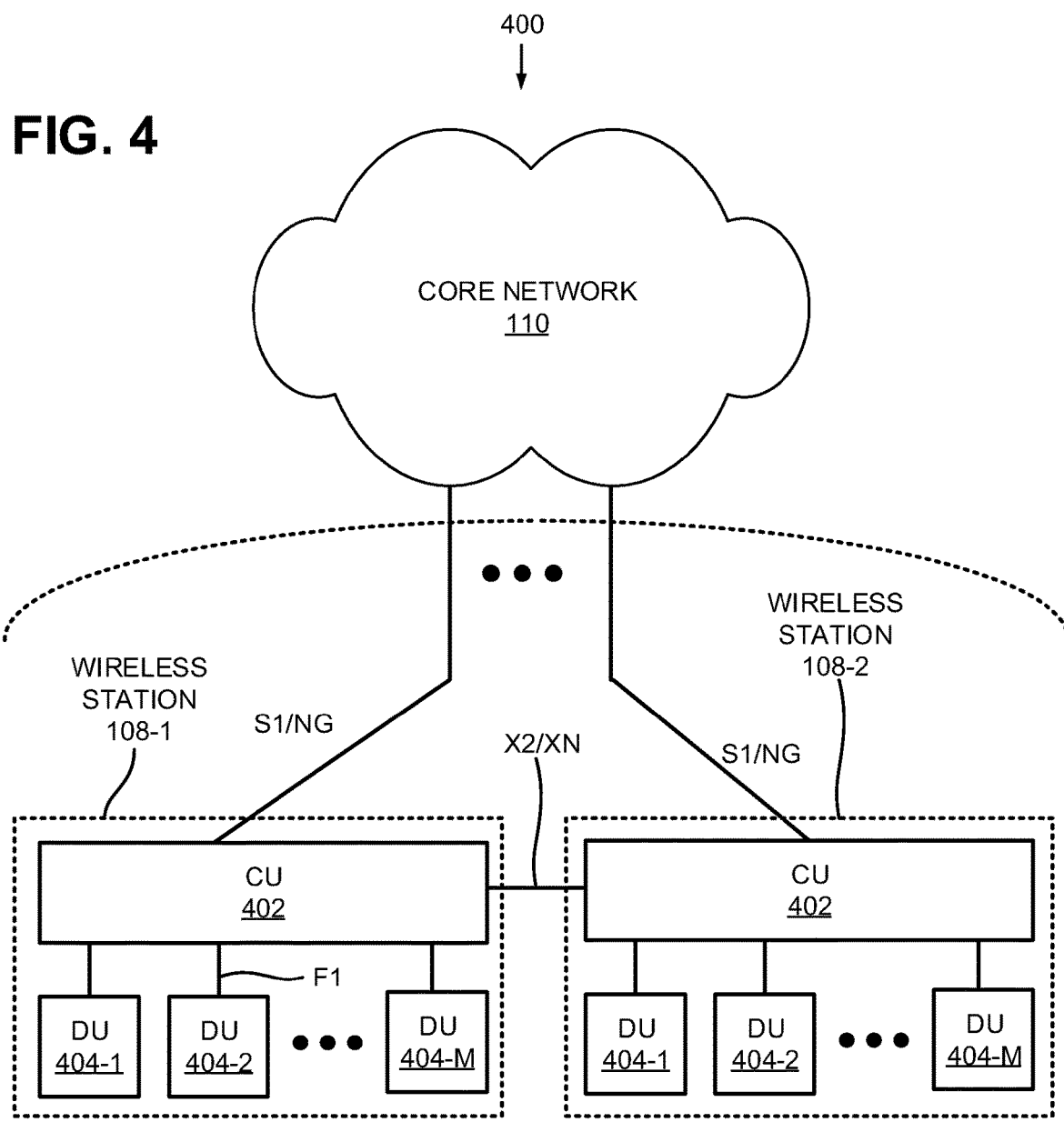
FIG. 4 illustrates exemplary components of the access network of FIG. 1 according to one implementation.

FIG. 4 illustrates exemplary components of access network 106 of FIG. 1 according to one implementation. Consistent with FIG. 1, access network 106 includes wireless stations 108-1 and 108-2—other wireless stations 108 are not shown in FIG. 4. Each wireless station 108 includes a central unit (CU) 402, distributed units (DUs) 404-1 through 404-M, and one or more Radio Units (RUs). For simplicity, RUs are not shown in FIG. 4.

CU 402 may process upper layers of the communication protocol stack for wireless stations 108. For example, assume that wireless station 108 is a gNB. Communications at gNB user plane includes, from the lowest layer to the highest layer: a physical (PHY) layer, a Media Access Control layer (MAC) layer, a Radio Link Control (RLC) layer, and a Packet Data Convergence Protocol (PDCP) layer. The control plane communications include the same layers as those in the user plane, and in addition, includes a Radio Resource Control (RRC) layer. CU 402 may process information at predetermined, higher layers of the user plane and control plane. CUs 402 do not necessarily be physically located near DUs 402, and may be implemented as cloud computing elements, through network function virtualization (NFV) capabilities of the cloud. As shown, CU 402 communicates with the components of core network 110 through S1/NG interface and with other CUs 402 through X2/XN interface.

DUs 404 may process lower layers of the communication protocol stack and may provide support for one or more cells with multiple radio beams. In addition, DUs 404 may handle UE device mobility, from DU to DU, gNB to gNB, cell to cell, beam to beam, etc. DUs 404 communicate with a CU 402 through F1 interface.

In the context of optimizing network functions for UAV communications, SONF 312 forwards data and control signals to CUs 402 through S1/NG control/user plane interface. CUs 402 coordinate with and control other CUs 402 and DUs 404 through X2/XN and F1 interfaces, respectively. CUs 402 may control, for example, RLF timer expiration values, beam shape, beam directions, etc., through DUs 404 and RUs (not shown).

Figure 5:
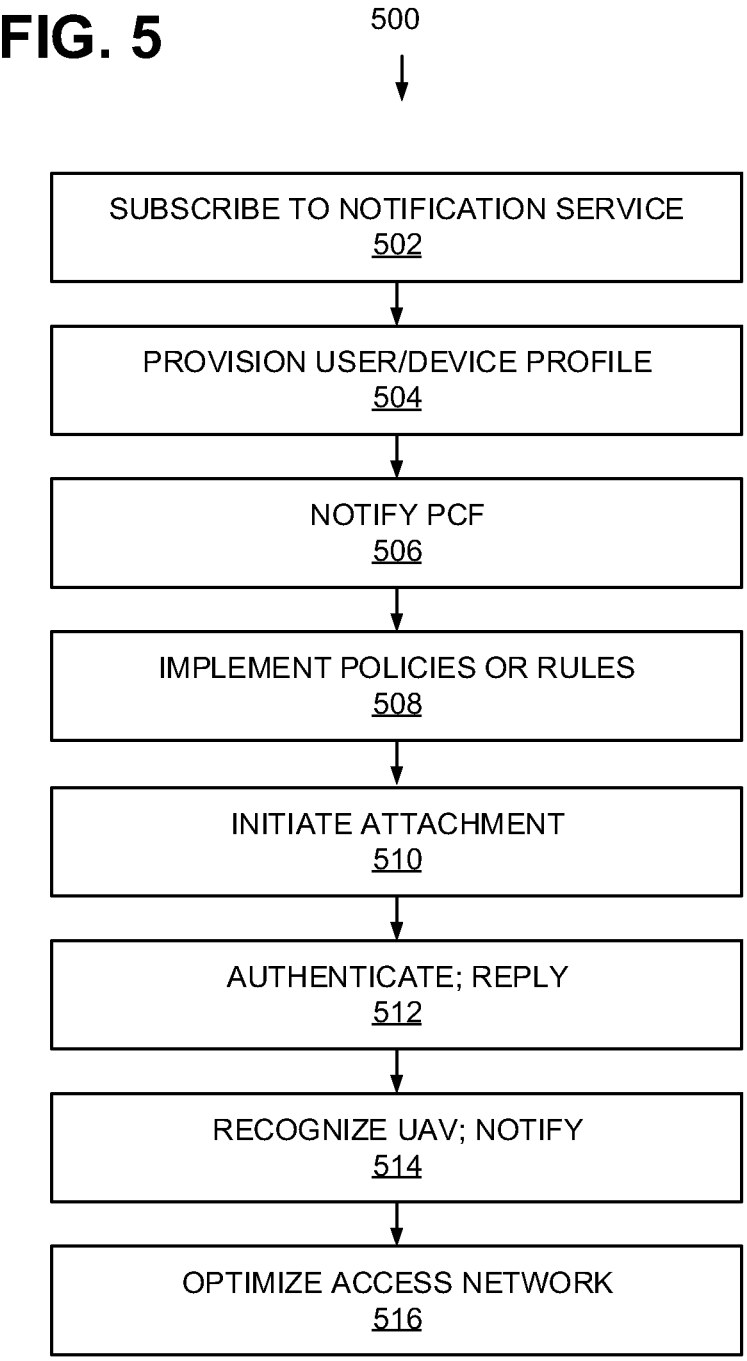
FIG. 5 is a flow diagram of an exemplary process for optimizing the networks of FIG. 1 to support Unmanned Aerial Vehicle (UAV) communications over the networks, according to one implementation.
Figure 6:
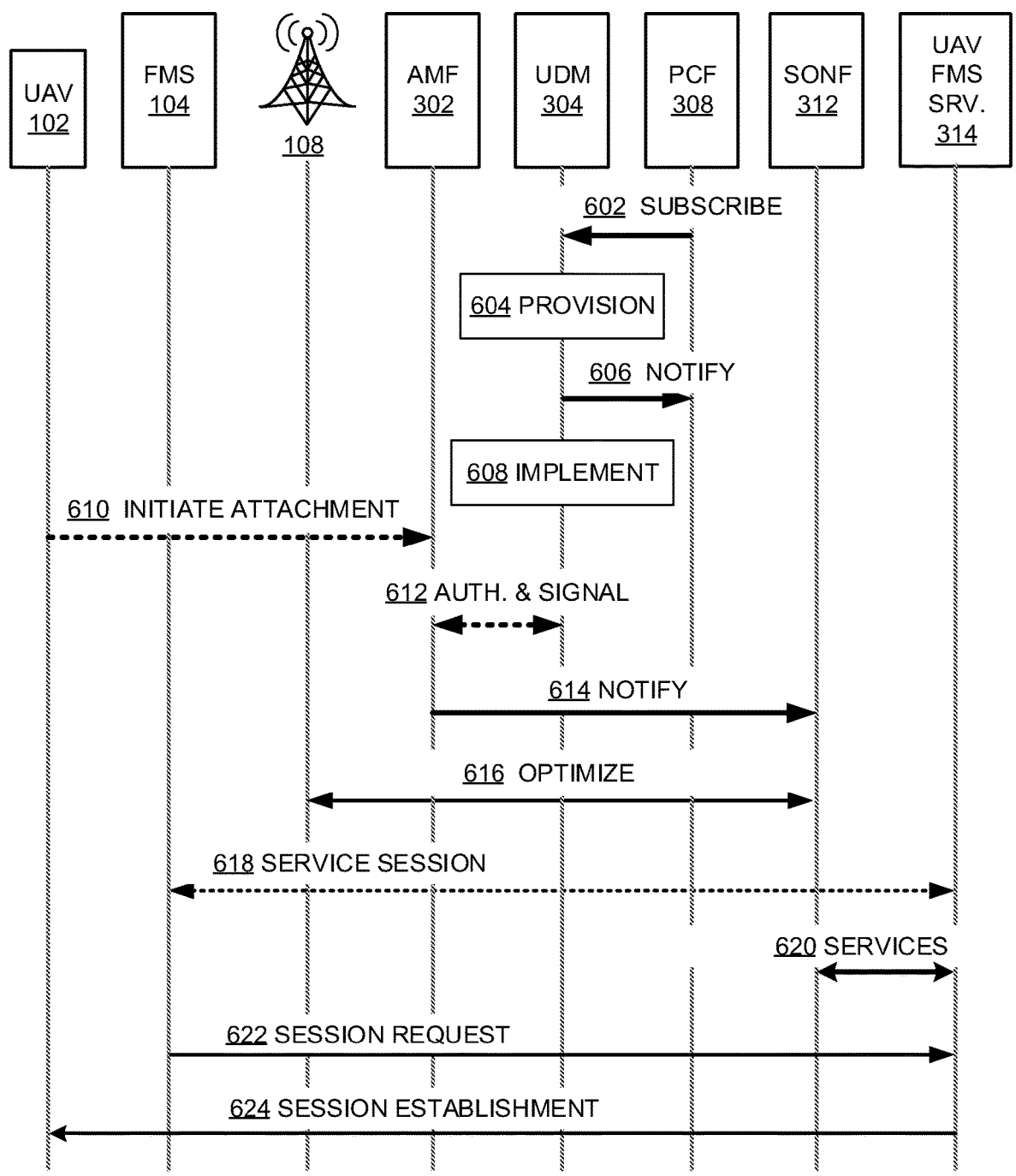
FIG. 6 is a signal flow diagram that is associated with the process of FIG. 5 according to one implementation.

FIG. 5 is a flow diagram of an exemplary process 500 for optimizing the networks of FIG. 1 to support UAV 102 communications over the networks. FIG. 6 is a signal flow diagram that is associated with process 500. Process 500 may be performed by various components of FIGS. 1-4, such as UAV 102, flight management system 104, network device 200, components of core network 110, access network 106, external network 112, etc. Although process 500 is described below with references to 5G core network components, process 500 may be performed with or by 4G core network components, or other advanced core network components.

As shown, process 500 may include PCF 308 subscribing to UDM 304 (block 502; signal 602). By subscribing to UDM 304, PCF 308 is notified when UDM 304 updates a user profile or device profile or creates a new user/device profile (e.g., when a user subscribes to network 114 for services). At block 504, a UAV 102, which is associated with a particular user profile, is registered at UDM 102. That is, a UAV device profile associated with UAV 102 is provisioned at UDM 302 (block 604). In response to the provisioning, UDM 304 notifies PCF 308 (block 506; signal 606), which then implements UAV 102-specific policies and rules at various components in network 114 (block 508; signal 608). For example, PCF 308 may forward policies/rules for handling UAV 102 communications to AMF 302, UPF 310, SONF 312, etc.

Process 500 may further include UAV 102 initiating attachment with access network 106 (block 510; signal 610). For example, UAV 102 may establish a Radio Resource Control (RRC) connection with wireless station 108, and then send a session request to core network 110. When the request from UAV 102 reaches AMF 302, AMF 302 may instruct UDM 304 to authenticate UAV 102 (block 512; signal 612).

In response to AMF 302's request, UDM 304 may look up its user/device profiles, and perform the authentication based on UAV 102 credentials. Furthermore, assuming that the authentication was successful, UDM 304 may look up additional information regarding UAV 102 (e.g., in accordance with the policy/rule received from PCF 308). When UDM 304 determines that the UAV 102 is a particular UE device type (e.g., an unmanned aerial vehicle), UDM 304 may forward an Information Element (IE), along with the reply to the authentication request from AMF 302, to AMF 302 (block 512; signal 612).

Process 500 may further include AMF 302 recognizing that the UAV 102 is an unmanned aerial vehicle based on the Information Element received from UDM 304 (block 514), performing the functions for establishing a bearer for real-time communications for UAV 102, and notifying other core components that an unmanned aerial vehicle, the UAV 102, is attached to network 114 (block 514; signal 614). For example, AMF 302 may notify SONF 314 that an unmanned aerial vehicle, UAV 102, is attached to network 114.

When SONF 314 is aware of the presence of UAV 102 in network 114, SONF 314 may take steps to optimize the operation of wireless stations 108 to facilitate UAV communication (block 516; signal 616). For example, SONF 314 may send instructions to wireless stations 108 to adjust their beam widths and beam directions to ensure that UAV 102 will have reliable 5G communication links. Furthermore, to ensure that UAV 102's entry and exit from a coverage area does not result in network 114 constantly tearing down and setting up a bearer for UAV 102 due to RLFs, SONF 314 may request wireless stations 108 to increase RLF timer expiration values.

FIG. 7 is a flow diagram of an exemplary process 700 that is associated with the networks of FIG. 1 for providing services to the flight management system 104 and UAV 102. FIG. 6 illustrates signals between the components that are associated with process 700. Process 700 may be performed by flight management system 104, UAV 102, and various components of network 114.

Process 700 may include flight management system 104 requesting a service session with UAV FMS server 314 (block 702; signal 618). The request and the grant may entail an RRC connection, a session request, and session creation. After establishing a service connection with UAV FMS server 314, flight management system 104 may exchange communications with UAV FMS server 314 (block 704). These exchanges may relate to flight management system 104 obtaining various services from UAV FMS server 314 (signal 620).

For example, flight management system 104 may forward a flight plan for the UAV 102 to UAV FMS server 314 and request UAV FMS 314 to prime access network 106 for UAV communications. In response, UAV FMS server 314 may determine a list of wireless stations near the flight path, and request SONF 312 to instruct wireless stations 108 along the flight path to adjust their beam widths and increase their RLF timer expiration values. In another example, flight management system 104 may request UAV FMS server 314 to provide coordinates of the locations of 5G wireless stations along the flight path. When UAV FMS server 314 receives the request, UAV FMS server 314 may contact SONF 312 to obtain the information from wireless stations 108. After UAV FMS server 314 obtains from SONF 312 and relays the information to flight management system 104, flight management system 104 may use the information to control UAV 102 communication power levels. Flight management system 104 may decrease UAV 102 communication power when only 4G wireless stations (e.g., eNB) are available for UAV 102 to connect to (in its flight path) and curtail transmissions of video or other high bandwidth using data transmissions, as 4G wireless stations 108 may not provide enough bandwidths to forward the data to flight management system 104. In another example, when flight management system 104 receives the coordinates of the locations of various wireless stations 108 close the UAV flight paths, flight management system 104 may modify the UAV 102's planned flight path, such that UAV 102 will fly through areas that are well covered by high bandwidth wireless stations 108 (e.g., gNB).

Returning to FIG. 6, flight management system 104 may request UAV FMS server 314 to establish a session between UAV 102 and flight management system 104, provided that UAV 102 is attached to network 114 (block 706; signal 622). In response, UAV FMS server 314 may connect flight management system 104 to UAV 102 (block 708; signal 624). Over the established session, UAV 102 and flight management system 104 may exchange information and data, such as flight commands, videos from UAV 102, and/or telemetry information from UAV 102.

In this specification, various preferred embodiments have been described with reference to the accompanying drawings. It will be evident that modifications may be made thereto, and additional embodiments may be implemented, without departing from the broader scope of the invention as set forth in the claims that follow. For example, although the systems and methods have been described above in the context of 4G network and 5G network, in other implementations, the systems and the methods may be implemented in other advanced networks. In such implementations, the PCF, UDM, SONF, and other components may be replaced by appropriate, corresponding network components. Thus, the specification and drawings are accordingly to be regarded in an illustrative rather than restrictive sense.

In the above, while a series of blocks have been described with regard to the processes illustrated in FIGS. 5 and 7, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
a processor to execute instructions to:
receive device data for a wireless communication device, wherein the device data indicates that the wireless communication device is an unmanned aerial vehicle;
store the device data as part of a subscription profile;
receive a request to establish a session for the wireless communication device over a wireless network;
identify the wireless communication device as an unmanned aerial vehicle, wherein when identifying, the processor is to:
receive an identifier, associated with the wireless communication device, from the wireless communication device;
use the identifier to retrieve the subscription profile; and
determine, based on the subscription profile, that the wireless communication device is an unmanned aerial vehicle; and
modify operating parameters of a radio access network (RAN), with which the wireless communication device has a radio resource control (RRC) link, to optimize communication between the RAN and the identified unmanned aerial vehicle,
wherein the wireless network includes the RAN.

2. The device of claim 1, wherein when the processor executes the instructions to store the device data as part of the subscription profile, the processor is configured to:
cause a Policy Control Function (PCF) in a Fifth Generation (5G) core network to send policies and rules for handling communications associated with the unmanned aerial vehicle to one or more components of the wireless network.

3. The device of claim 1, wherein when the processor executes the instructions to store the device data as part of the subscription profile, the processor is configured to:
store the device data at a Unified Data Management (UDM) in a Fifth Generation (5G) core network, wherein the wireless network includes the 5G core network.

4. The device of claim 3, wherein when the processor identifies the wireless communication device as an unmanned aerial vehicle, the processor is configured to:
cause the UDM to authenticate the wireless communication device.

5. The device of claim 3, wherein when the processor identifies the wireless communication device as an unmanned aerial vehicle, the processor is configured to:
cause the UDM to send a first notification to an Access and Mobility Function (AMF) included in the 5G core network, and
cause the AMF to send a second notification to a Self-Organizing Network Function (SONF) included in the wireless network,
wherein the first notification and the second notification indicate that the wireless communication device is an unmanned aerial vehicle.

6. The device of claim 1, wherein when the processor modifies the operating parameters of the RAN), the processor is configured to:
cause a Self-Organizing Network function, included in the wireless network, to modify a direction and a shape of an antenna beam from a gNB to the unmanned aerial vehicle,
wherein the RAN includes the gNB.

7. The device of claim 1, wherein when the processor modifies the operating parameters of the RAN, the processor is configured to:
cause a Self-Organizing Network function, included in the wireless network, to modify a Radio Link Failure (RLF) timer expiration value of a gNB, in the RAN, with which the wireless communication device has established the RRC link.

8. A method comprising:
receiving device data for a wireless communication device, wherein the device data indicates that the wireless communication device is an unmanned aerial vehicle;
storing the device data as part of a subscription profile,
receiving a request to establish a session for the wireless communication device over a wireless network;
identifying the wireless communication device as an unmanned aerial vehicle, wherein the identifying includes:
receiving an identifier, associated with the wireless communication device, from the wireless communication device;
using the identifier to retrieve the subscription profile; and
determining, based on the subscription profile, that the wireless communication device is an unmanned aerial vehicle; and
modifying operating parameters of a radio access network (RAN), with which the wireless communication device has a radio resource control (RRC) link, to optimize communication between the RAN and the identified unmanned aerial vehicle,
wherein the wireless network includes the RAN.

9. The method of claim 8, wherein storing the device data as part of the subscription profile includes:
causing a Policy Control Function (PCF) in a Fifth Generation (5G) core network to send policies and rules for handling communications associated with the unmanned aerial vehicle to one or more components of the wireless network.

10. The method of claim 8, wherein storing the device data as part of the subscription profile includes:
   storing the device data at a Unified Data Management (UDM) in a Fifth Generation (5G) core network, wherein the wireless network includes the 5G core network.

11. The method of claim 10, wherein identifying the wireless communication device as an unmanned aerial vehicle includes:
   causing the UDM to authenticate the wireless communication device.

12. The method of claim 10, wherein identifying the wireless communication device as an unmanned aerial vehicle includes:
   causing the UDM to send a first notification to an Access and Mobility Function (AMF) included in the 5G core network, and
   causing the AMF to send a second notification to a Self-Organizing Network Function (SONF) included in the wireless network,
   wherein the first notification and the second notification indicate that the wireless communication device is an unmanned aerial vehicle.

13. The method of claim 8, wherein modifying the operating parameters of the RAN includes:
   causing a Self-Organizing Network function, included in the wireless network, to modify a direction and a shape of an antenna beam from a gNB to the unmanned aerial vehicle,
   wherein the RAN includes the gNB.

14. The method of claim 8, wherein modifying the operating parameters of the RAN includes:
   causing a Self-Organizing Network function, included in the wireless network, to modify a Radio Link Failure (RLF) timer expiration value of a gNB, in the RAN, with which the wireless device has established the RRC link.

15. A non-transitory computer-readable medium comprising processor-executable instructions, when executed by a processor, cause the processor to:
   receive device data for a wireless communication device, wherein the device data indicates that the wireless communication device is an unmanned aerial vehicle;
   store the device data as part of a subscription profile;
   receive a request to establish a session for the wireless communication device over a wireless network;
   identify the wireless communication device as an unmanned aerial vehicle, wherein when identifying, the processor is to:
      receive an identifier, associated with the wireless communication device, from the wireless communication device;
      use the identifier to retrieve the subscription profile; and
      determine, based on the subscription profile, that the wireless communication device is an unmanned aerial vehicle; and
   modify operating parameters of a radio access network (RAN), with which the wireless communication device has a radio resource control (RRC) link, to optimize communication between the RAN and the identified unmanned aerial vehicle,
   wherein the wireless network includes the RAN.

16. The non-transitory computer-readable medium of claim 15, wherein when the processor stores the device data as part of the subscription profile, the processor is configured to:
   store the device data at a Unified Data Management (UDM) in a Fifth Generation (5G) core network, wherein the wireless network includes the 5G core network.

17. The non-transitory computer-readable medium of claim 15, wherein, when the processor stores the device data as part of the subscription profile, the processor is configured to:
   cause a Policy Control Function (PCF) in a Fifth Generation (5G) core network to send policies and rules for handling communications associated with the unmanned aerial vehicle to one or more components of the wireless network.

18. The non-transitory computer-readable medium of claim 16, wherein when the processor identifies the wireless communication device as an unmanned aerial vehicle, the processor is configured to:
   cause the UDM to authenticate the wireless communication device.

19. The non-transitory computer-readable medium of claim 16, wherein when the processor identifies the wireless communication device as an unmanned aerial vehicle, the processor is configured to:
   cause the UDM to send a first notification to an Access and Mobility Function (AMF) included in the 5G core network, and
   cause the AMF to send a second notification to a Self-Organizing Network Function (SONF) included in the wireless network,
   wherein the first notification and the second notification indicate that the wireless communication device is an unmanned aerial vehicle.

20. The non-transitory computer-readable medium of claim 15, wherein when the processor modifies the operating parameters of the RAN, the processor is configured to:
   cause a Self-Organizing Network function, included in the wireless network, to modify a direction and a shape of an antenna beam from a gNB to the unmanned aerial vehicle,
   wherein the RAN includes the gNB.

* * * * *